United States Patent [19]
Bryan et al.

[11] Patent Number: 5,434,896
[45] Date of Patent: * Jul. 18, 1995

[54] WEAR RESISTANT COATING FOR COMPONENTS OF FUEL ASSEMBLIES AND CONTROL ASSEMBLIES, AND METHOD OF ENHANCING WEAR RESISTANCE OF FUEL ASSEMBLY AND CONTROL ASSEMBLY COMPONENTS USING WEAR-RESISTANT COATING

[75] Inventors: William J. Bryan, Pittsburgh, Pa.; David Jones, Austin, Tex.

[73] Assignee: Combustion Engineering, Inc., Windsor, Conn.

[*] Notice: The portion of the term of this patent subsequent to Dec. 15, 2009 has been disclaimed.

[21] Appl. No.: 990,670

[22] Filed: Dec. 14, 1992

Related U.S. Application Data

[63] Continuation-in-part of Ser. No. 577,688, Sep. 4, 1990, Pat. No. 5,171,520.

[51] Int. Cl.$^6$ .................................................. G21C 3/00
[52] U.S. Cl. ..................................... 376/414; 376/416; 501/11
[58] Field of Search ............... 376/414, 416, 425, 417; 976/11, DIG. 53; 501/61, 62, 21, 25

[56] References Cited

U.S. PATENT DOCUMENTS

| | | | |
|---|---|---|---|
| 3,678,395 | 7/1972 | Hunton et al. | 325/446 |
| 3,748,384 | 1/1974 | Webb | 501/210.55 |
| 3,784,384 | 1/1974 | Webb | 106/39 |
| 4,097,402 | 6/1978 | Grubb | 252/301.1 |
| 4,112,648 | 9/1978 | Suzuki et al. | 52/508 |
| 4,338,380 | 7/1982 | Erickson et al. | 428/594 |
| 4,432,933 | 2/1984 | Teitel et al. | 376/152 |
| 4,551,647 | 11/1985 | Day | 310/335 |
| 4,573,629 | 3/1986 | Imahashi et al. | 228/173.2 |
| 4,695,476 | 9/1987 | Feild, Jr. | 427/6 |
| 4,722,916 | 2/1988 | Watanabe et al. | 501/118 |
| 4,788,163 | 11/1988 | Hang et al. | 501/17 |
| 4,990,303 | 2/1991 | Bryan et al. | 376/419 |
| 4,992,298 | 2/1991 | Deutchman et al. | 427/38 |
| 5,055,318 | 10/1991 | Deutchman et al. | 427/38 |
| 5,094,804 | 3/1992 | Schweitzer | 376/414 |
| 5,161,728 | 11/1992 | Li | |
| 5,171,520 | 12/1992 | Bryan et al. | 376/414 |

FOREIGN PATENT DOCUMENTS

0477004A3 3/1992 European Pat. Off.

OTHER PUBLICATIONS

Patent Abstracts of Japan vol. 13, No. 454 (P-944) (3802) Oct. 13, 1989 & JP, A, 01 176 995 (Toshiba) Jul. 13, 1989.
Patent Abstracts of Japan vol. 14, No. 389 (P-1095) Aug. 22, 1990 & JP, A, 02 147 895 (Toshiba) Jun. 6, 1990.
Database WPI Week 8825, Derwent Publications Ltd.; an 88-171080 & JP, A, 63 108 295 (Toshiba) May 13, 1988.
"AT&T Claims First Commercial Application of Bonding Diamond Film to Metal", Photonics Spectra, Nov. 1992.
International Search Report for International Application No. PCT/US 93/07531.
Patent Abstracts of Japan vol. 16, No. 110 (C-920) Mar. 18, 1992 & JP, A, 03 285 047 (Toshiba Corp.) Dec. 16, 1991.
Patent Abstracts of Japan vol. 7, No. 291 (M-265) (1436) Dec. 27, 1983 & JP, A, 58, 163 820 (Daido Tokushuko) Sep. 28, 1983.

*Primary Examiner*—Donald P. Walsh
*Assistant Examiner*—Menna Chelliah
*Attorney, Agent, or Firm*—Chilton, Alix & Van Kirk

[57] ABSTRACT

A wear resistant coating (50) for a component of a nuclear reactor fuel assembly or control assembly comprising a ceramic material (52) which is premixed with a glass (54). The coating is applied to components of the nuclear reactor vessel, or portions thereof, which are subject to the greatest wear due to friction or fretting. Also disclosed herein is a method for enhancing the wear resistance of a portion of a metal component of a nuclear reactor by coating a surface of the component with a wear-resistant coating formed from diamond, metal nitride, or a composite of a ceramic material and a glass.

17 Claims, 2 Drawing Sheets

WEAR RESISTANT COATING FOR COMPONENTS OF FUEL ASSEMBLIES AND CONTROL ASSEMBLIES, AND METHOD OF ENHANCING WEAR RESISTANCE OF FUEL ASSEMBLY AND CONTROL ASSEMBLY COMPONENTS USING WEAR-RESISTANT COATING

BACKGROUND OF THE INVENTION

This is a continuation-in-part of U.S. application Ser. No. 07/577,688, filed Sep. 4, 1990. Patented U.S. Pat. No. 5,171,520.

This invention relates generally to nuclear fuel assemblies and control assemblies. More particularly, this invention relates to a wear resistant coating for components of nuclear fuel assemblies and control assemblies, and a method of enhancing the wear resistance of nuclear fuel assembly and control assembly components.

One form of a nuclear reactor fuel assembly includes a support grid having an egg-crate configuration which supports a plurality of fuel rods, each of which comprises a cladding tube containing fuel pellets. The grid also includes guide tubes for receiving the control tubes of a control assembly. The fuel rods are supported by the grid between an upper end fitting or top nozzle and a lower end fitting or bottom nozzle. When the fuel assembly is loaded into a reactor core, an upper core plate over the fuel assembly applies pressure to holddown spring members on the upper end fitting of the fuel assembly, thereby holding the fuel assembly in place. The reactor coolant flows upwardly from holes in the lower end fitting along the outer surface of the fuel rods, and upwardly through holes in the upper end fitting.

Components of the fuel assembly and control assembly typically are manufactured from zirconium-alloy or various other metal-alloy materials. When the components are made from a zirconium-alloy, their useful life is limited by debris fretting and/or friction-induced wear. For example, zirconium-alloy fuel rods employed in nuclear reactors are exposed to high temperature water which is typically in the range 300° C. to 400° C. The water is subjected to high pressures and frequently contains metal particles of stainless steel or Inconel-alloy steel which originate at reactor locations remote from the fuel rods themselves. The metallic particles tend to collect near the bottom of the fuel rods and are entrapped by the first support grid for the fuel rods. The metallic debris may be maintained in a quasi-suspensive state due to vibration and movement of the water through the reactor.

The metallic particles which form the debris may be hardened by radiation. The hardened metallic state tends to rapidly accelerate the wear or erosion of the cladding tubes of the fuel rods. The resultant tube fretting may be sufficient so as to ultimately result in penetration of the cladding tube wall, thereby resulting in failure of the cladding.

While the problem of wear is most common in the fuel rods, other components of fuel assemblies and control assemblies are subjected to erosion by a coating of hardened debris deposited thereon, or by friction-induced wear due to contact with other reactor components. Thus, the long term integrity of the fuel assembly and control assembly components is a direct function of their resistance to friction and debris fretting.

The hostile environment of the reactor dictates that any structural modification or enhancement to the components of the fuel assembly and control assembly satisfy a number of constraints. First, any wear resistant structure must be significantly harder than the metallic debris particles to effectively resist abrasion from the particles. Any coating applied to the components must have excellent long term adhesive qualities, be fully compatible with the thermal expansion of the components and also form a strong bond with the components. In addition, any coating must be resistant to the chemical environment in the reactor which characteristically includes hot water at a pH of approximately 7. The thickness of any coating applied to the components must be relatively thin so that the flow of water around the fuel rods is not significantly impeded by the coating and that the coating not function as a thermal barrier. Any coating is preferably capable of application in a process which does not require heating of the cladding tube above 400° C. In addition, it is also desirable that the coating be inexpensive and be suitable for mass production.

Coatings of various forms and functions have been applied to the inside surfaces of cladding tubes for nuclear reactors. For example, U.S. Pat. No. 4,990,303, issued Feb. 5, 1991 and assigned to the assignee of the present invention discloses a fuel element for a nuclear reactor having a zirconium-tin alloy cladding tube. A thin coating of an enriched boron-10 glass containing burnable poison particles is deposited on the inside of the cladding tube from a liquid sol-gel. The coating includes a glass binder which is applied on the inside of the zirconium-alloy cladding tube.

U.S. Pat. No. 3,625,821 discloses electroplating the inside surface of a tube with coating of a matrix metal and boron compound of, for example, nickel, iron, manganese or chrome. Boron compounds such as boron nitride, titanium boride and zirconium boride are electroplated onto a Zircaloy substrate. U.S. Pat. No. 4,695,476 discloses a vapor deposition of volatized boron compounds on the inside of fuel rod cladding.

SUMMARY OF THE INVENTION

Briefly stated, the invention in a preferred form is a wear resistant coating for application to a metal surface of a component of a nuclear reactor fuel assembly or control assembly. The coating comprises ceramic particles dispersed in a glass. The ceramic particles and/or glass have a coefficient of thermal expansion approximately equal to the coefficient of thermal expansion of the metal surface. The glass preferably is calcium zinc borate, calcium magnesium aluminosilicate or sodium borosilicate.

In a particularly preferred embodiment of the invention, the ceramic particles comprise zircon, and even more preferably comprise a zirconia powder which is dispersion strengthened with a suitable quantity of alumina. Such a dispersion preferably contains about 0–20 wt % alumina, more preferably 0–10 wt % alumina, and most preferably 5–6 wt % alumina.

The coating in one embodiment has a thickness of about 127 microns (5 mil) and has an outside surface which substantially consists of the ceramic material.

Components of the fuel assembly and control assembly which can be coated according to the invention include, without limitation, the fuel rods, grid, grid springs, guide tubes, holddown springs, upper and lower end fittings, control rods, upper hub assembly, and springs in the hub mechanism. The portions of these components which preferably are coated in accordance with the invention are any portions which are subjected to fretting or friction-induced wear during normal operation of the reactor.

Another preferred form of the invention is a component of a reactor vessel, comprising a metallic surface and coating means carried by the surface. The coating means includes a ceramic material dispersed in a glass. The metallic surface preferably comprises Zircaloy, Inconel or stainless steel. The ceramic material is bonded to the metallic surface by the glass. The ceramic particles and/or glass have a coefficient of thermal expansion approximately equal to the coefficient of thermal expansion of the metallic surface.

To form the ceramic and glass coating, the ceramic material and glass are premixed in a ratio sufficient to ensure that the glass bonds the ceramic material to the metal component. The component is preheated to a temperature between about 300° C. and 400° C. The coating mixture is then flame sprayed onto the outside surface of the tube to form the wear resistant coating. The flame spraying is conducted under conditions wherein the glass particles are transformed to a semi-molten state while the ceramic particles remain in a non-molten state. The outside surface of the matrix preferably is etched to remove glass material to form an exposed outside surface which substantially consists of the ceramic material. Preferably, the coating is selectively applied to the component on the portions of the component surface that will be subject to the greatest wear.

Another form of the invention is a method of improving the wear resistance of a component of a nuclear reactor by adhering a wear-resistant coating to the component surface. The coating comprises diamond, a metal nitride or a composite of ceramic particles and glass. The coating is adhered to the component surface at a temperature of about 400° C. or less. The coating preferably has a thickness which is sufficient to prevent the component from wearing out due to friction or fretting during its normal life cycle. When a diamond or metal nitride coating is used, it preferably, although not necessarily, has a thickness of 5 microns or less. When a glass-ceramic composite coating is employed, its thickness is preferably about 5 mil or less. The coatings can enhance the wear resistance of fuel assembly and control assembly components to effectively prevent them from becoming punctured or worn out before the end of their useful life. Thus, fuel assembly components which are coated by the method of the invention will generally remain unpunctured for the anticipated use in three reactor cycles, and control assembly components coated by the method of the invention can last as long as the life of the reactor itself.

An object of the invention is to provide a new and improved nuclear reactor cladding having an enhanced resistance to wear from metallic debris surrounding the components of a nuclear reactor.

Another object of the invention is to provide a new and improved coating which may be applied in an efficient and cost effective manner to enhance the wear resistance of components of nuclear fuel assemblies and control assemblies.

A further object of the invention is to provide a new and improved method for manufacturing components of nuclear reactor vessels having enhanced wear resistant properties.

Other objects and advantages of the invention will become apparent from the drawings and the specification.

DESCRIPTION OF THE PREFERRED EMBODIMENTS

With reference to the drawings wherein like numerals represent like parts throughout the figures, a fuel rod having an enhanced wear resistant coating formed from a glass-ceramic composite material in accordance with the present invention is generally designated by the numeral 10. Fuel rod 10 is employed in a nuclear reactor and includes a zirconium-alloy cladding tube 20 which contains pellets 30 of fissionable material, such as $UO_2$. The tube is commonly made of zirconium-tin alloy such as Zircolay-2 or Zircolay-4.

Figure 1:
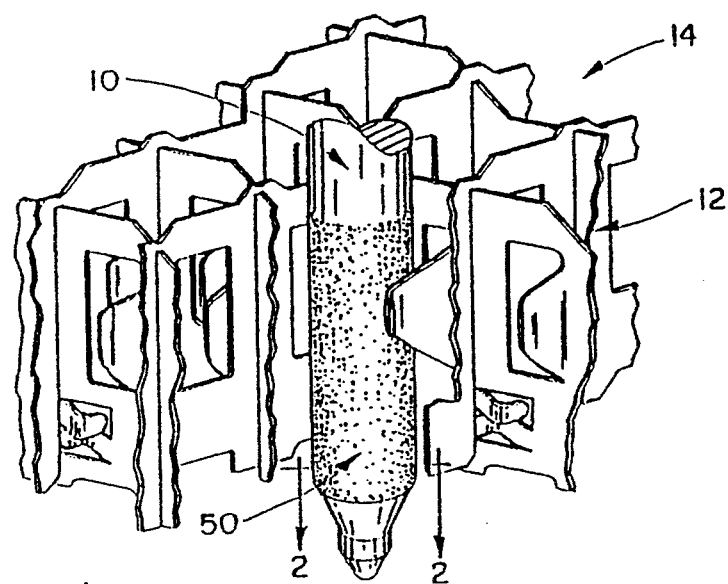
FIG. 1 is a perspective view, partly in schematic, illustrating a fuel assembly including fuel rods having a wear resistant coating formed from a glass-ceramic composite material in accordance with the present invention.

The fuel rods 10 are conventionally mounted in parallel fashion to a support structure including a support grid 12 of a fuel assembly 14 as schematically illustrated in FIG. 1. The lower portions of the fuel rods are in effect cantilevered into the flow of water which commonly contains debris comprising metallic particulate matter such as stainless steel or Inconel alloy steel (not illustrated). The debris particles are often hardened by irradiation and are known to rapidly fret the tubes 20 as the water flows in the direction indicated by the arrow.

Figure 2:
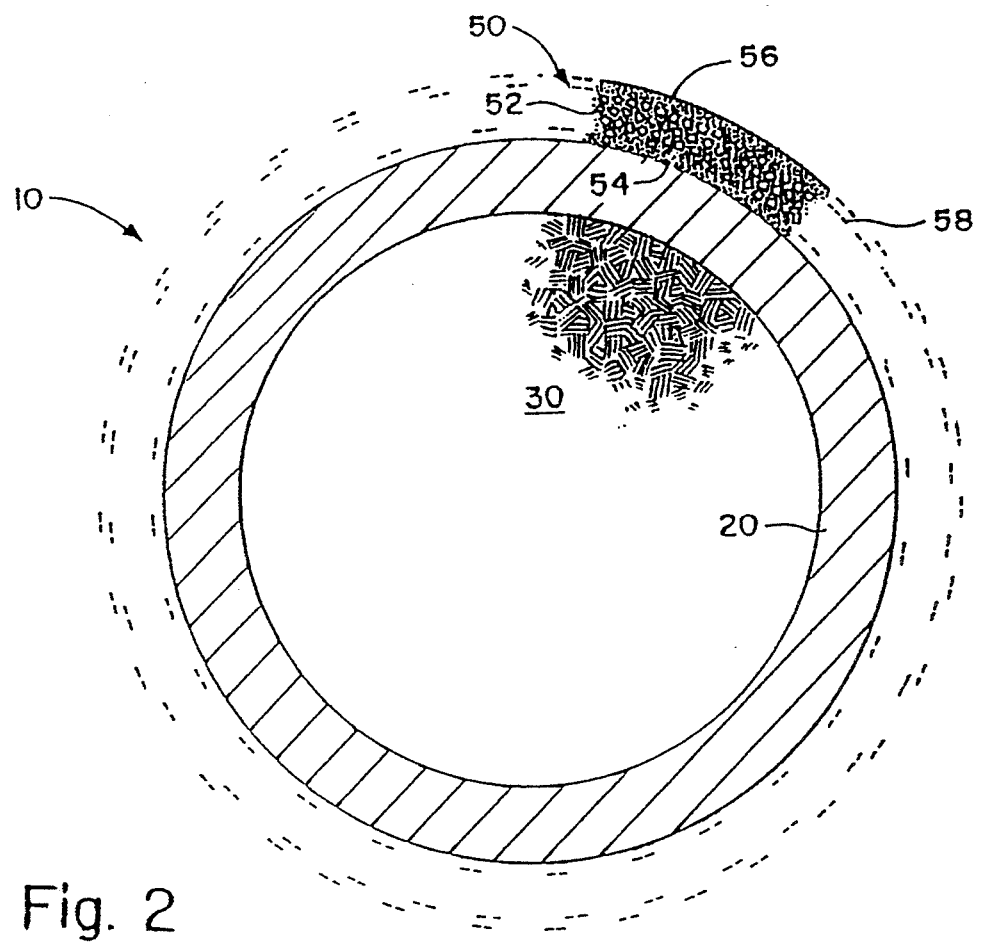
FIG. 2 is an enlarged cross-sectional view, partly in schematic, of a fuel rod taken along the line 2—2 of FIG. 1.

In accordance with the invention, a coating 50 is applied to the exterior surface of the cladding tube 20. The cladding tube coating 50 is comprised of a matrix of a ceramic material 52 and a glass binder 54, both of which are schematically illustrated. The relative dimensions of coating 50 are exaggerated in FIG. 2 for description purposes. The ceramic material preferably has a high degree of hardness, a high degree of thermal conductivity and a thermal expansion which is approximately equal to that of the zirconium-alloy substrate of the cladding tube 20. One preferred ceramic material is zircon which in a powder form has a particulate diameter on the order of approximately 10–60 microns. Another preferred ceramic material is a zirconia powder of a similar particle size which is dispersion strengthened with alumina in an amount of 20 wt %, or more preferably 10 wt % alumina or less. This alumina-containing powder preferably has a flexural strength of about 2400 mPa at room temperature and 800 mPa at 1000° C. This powder also has a low Young's modulus, good abrasion resistance, thermal stability, and thermal shock resistance. The strength, abrasion resistance and fracture resistance of such powders are believed to be at least three times as high as the strength, abrasion resistance and fracture resistance of alumina.

The ceramic material 52 is mixed with a glass 54 which also has a thermal expansion compatible with the zirconium-alloy cladding tube. A number of glass compositions are suitable. The selected glass should have a long term resistance to very hot water which for the reactor environment typically is on the order 400° C. Calcium zinc borate, calcium magnesium aluminosilicate, and sodium borosilicate are all suitable glasses.

Thermal coefficients of expansion for the various materials are set forth in the following table:

| Material | CTE $\times 10^{-7}$C° |
| --- | --- |
| Zircaloy-4 | 48.9 |
| Zircon | 53 |
| Calcium zinc borate | 45–60 |
| Calcium magnesium aluminosilicate | 40–70 |
| Sodium borosilicate | 30–100 |

The ceramic material 52 and the glass 54 are premixed in a ratio so that the there will be sufficient glass to bind the ceramic material and bond the ceramic material to the cladding tube substrate. The particles of the ceramic and glass material have diameters typically on the order of 10–60 microns. The glass particles are preferably significantly smaller than the ceramic particles so that the glass particles will heat rapidly and a large quantity of particles will be available for bonding to each ceramic particle.

The zirconium-alloy cladding tube is heated to a temperature which is approximately in the range 300° to 350° C. It is naturally desirable to keep the processing temperature of the cladding tube below 400°. The mixture of the ceramic and glass particles is then flame sprayed onto the cladding tube. The flame spray characteristics are selected so that the glass particles will assume a semi-molten state while the ceramic particles are maintained in a non-molten state. The coating which is formed on the cladding tube substrate is primarily a ceramic composition with just enough glass to provide sufficient bonding of the ceramic material to the cladding tube.

It is not required that the glass have a high degree of hardness, although glasses typically will be harder than metals. The ceramic particles are bonded to the tube by the glass. The glass which bonds the ceramic particles is primarily disposed on the back side of the ceramic particles where the glass is not subject to abrasion. Even if glass on the outer surfaces is abraided by metallic particles, it will eventually wear away to expose the ceramic substrate and will function as a wear resistant barrier to prevent further wear of the coating.

The initial coating has some glass at the outer layer. The outer glass layer 56 may then be etched to remove the outer glass layer and expose the ceramic particles so that the outer surface 58 is substantially entirely composed of ceramic particles. While etching of the outer glass is not required, there may be some benefits to removing the glass since metallic particles of the debris could potentially strike the outer glass layer and initiate cracks and faults which would propagate throughout the glass matrix.

The coating 50 can be applied to the cladding tube in a flame spray process which is efficient and cost effective. The thickness of the coating is preferably about 50–250 microns (a few mils), and more preferably, about 50–130 microns (2–5 mils). A relatively thick coating would potentially impede the coolant water flow around the cladding tubes. In addition, thicker coatings might undesirably function as a thermal barrier.

Figure 3:
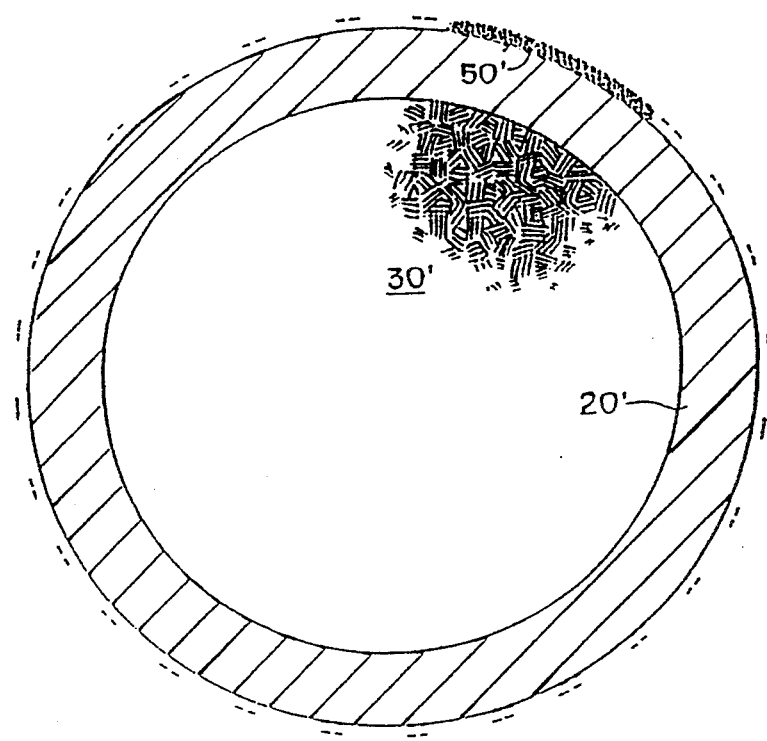
FIG. 3 is an enlarged cross-sectional view, partly in schematic, of a fuel rod having a wear-resistant diamond coating in accordance with the present invention.

The diamond coating 50', shown schematically in FIG. 3 on cladding tube 20' containing pellets 30' can be applied to a cladding tube or to another component using the film-forming method described in U.S. Pat. No. 4,992,298 issued Feb. 12, 1991 and U.S. Pat. No. 5,055,318 issued, both of which assigned to Beam Alloy Corporation, the contents of which are incorporated herein by reference. This method involves the steps of (a) cleaning the surface of the component with a first energy beam of inert atoms, such as argon, having an energy level of about 500–1000 eV, (b) depositing a layer of a desired non-hydrocarbon substance, such as carbon atoms, on the substrate with a low energy, sputtered atomic beam, such as argon, which preferably has an energy level of about 1–50 eV/atom, (c) simultaneously exposing the substrate to the first energy beam of inert atoms with a high energy of about 0.5 KeV to 100 KeV to grow a ballistically alloyed layer having a thickness of about 10–2000 Angstroms, and (d) continuing the sputtering and exposing the substrate to a lower energy beam of inert atoms from the source of the first energy beam at an energy level of about 50 eV to 500 eV to cause the growth of the layer of the non-hydrocarbon substance on the substrate to a final desired thickness.

When a diamond coating is applied according to this technique, metallurgical bonding of the coating to the component is likely to be sufficiently strong that it would not be necessary to have the coefficient of thermal expansion of the coating be similar to that of the metal surface to which it is adhered, as the coating will remain adhered to the component without this requirement. Diamond coatings of this type are extremely hard (4500–6000 DPHN), have excellent resistance to shock, abrasion, corrosion, heat (up to at least 538° C.(1000° F.)), are highly lubricious, and have a low coefficient of friction against stainless steel (0.08). This type of coating would be particularly advantageous because it can be applied at a low temperature, i.e. at 150° C. or less, and would be effective to reduce wear resistance even if it were applied in a thickness of only 1 micron. However, thicker coatings, such as coatings of up to at least 5 microns, also can be used.

Metal nitride films such as silicon nitride, chromium nitride, and the like, as well as films of other compositions having a hardness greater than that of the fuel assembly or control assembly components and which are described in U.S. Pat. Nos. 4,992,298 and 5,055,318, also can be used to enhance the wear resistance of fuel assembly components according to the invention.

The following example is included for purposes of illustration so that the invention can be more readily understood, and are in no way intended to limit the scope of the invention unless otherwise specifically indicated.

EXAMPLE

In one form of the coating 50, 6 kilograms of zircon ceramic material 52 having a nominal particle size diameter of 30 microns was premixed with 4 kilograms of calcium zinc borate glass 54 having a nominal particle diameter of <10 microns. A zirconium-alloy tube having a nominal outside diameter of 0.4 inch was heated to a temperature of approximately 200° C. The coating mixture was flame sprayed onto the outside surface of the cladding tube at a rate of 5 seconds per linear inch of tube so as to form an outer coating of approximately 5 mils in thickness. After the initial coating was applied, an etching solution of dilute HF acid was applied to remove the outer glass material.

It should be appreciated that the coatings 50 and 50'—even though relatively thin in cross-section—provide an effective abrasion resistant coating for the cladding tubes 20 and 20', respectively. The coatings 50 and 50' are substantially harder than the metal particles present in the surrounding reactor debris. The coatings are resistant to the chemical environment in the reactor and do not impede the flow of coolant water around the tubes. The coatings also do not constitute a significant thermal barrier. Moreover, the coatings can be applied in a relatively inexpensive and cost effective manner which is suitable for mass production. The coatings are particularly useful when applied to portions of fuel assembly and control assembly components which are subject to fretting and/or to metal-metal frictional contact with other components.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A component of a fuel assembly or control assembly of a nuclear reactor vessel, comprising:
    a metallic surface, and
    coating means carried by the surface for imparting wear resistance to the component, comprising a ceramic material dispersed in a glass, the ceramic material being bonded to the metallic surface by the glass, the glass having a coefficient of thermal expansion approximately equal to the coefficient of thermal expansion of the metallic surface.

2. A component according to claim 1, wherein the ceramic material has a coefficient of thermal expansion approximately equal to the coefficient of thermal expansion of the metallic surface.

3. A component according to claim 1, wherein the ceramic material comprises zircon.

4. A component according to claim 1, wherein the ceramic material comprises a zirconia powder which is dispersion strengthened with alumina.

5. A component according to claim 4, wherein the ceramic material contains no more than about 10 wt % alumina.

6. A component according to claim 2, wherein the ceramic material comprises a zirconia powder which is dispersion strengthened with alumina.

7. A component according to claim 6, wherein the ceramic material contains no more than about 10 wt % alumina.

8. A component according to claim 1, wherein the glass substantially consists of a material selected from the group consisting of calcium zinc borate, calcium magnesium aluminosilicate, and sodium borosilicate.

9. A component according to claim 1, wherein the metallic surface is zirconium-alloy, stainless steel, or Inconel.

10. A wear resistant coating for application to a zirconium alloy surface of a component of a nuclear reactor, the coating comprising ceramic particles dispersed in a glass, the ceramic particles and glass having coefficients of thermal expansion approximately equal to the coefficient of thermal expansion of the zirconium-alloy surface.

11. A coating according to claim 10, wherein the ceramic particles comprise zircon.

12. A coating according to claim 11, wherein the ceramic particles comprise a zirconia powder which is dispersion strengthened with alumina.

13. A coating according to claim 12 wherein the ceramic particles contain no more than about 10 wt % alumina.

14. A method for enhancing the wear resistance of a metal component of a nuclear reactor, comprising:
    forming a wear-resistant coating on a surface of the component, the wear-resistant coating comprising a composite of ceramic material dispersed in glass in which the glass has a coefficient of thermal expansion approximately equal to the coefficient of thermal expansion of the component surface.

15. A method according to claim 14, wherein the component is preheated to a temperature between 300° C. and 400° C. and the step of forming comprises flame spraying a mixture of particles of ceramic material and glass, wherein the glass particles are transformed to a semi-molten state while the ceramic particles remain in a non-molten state.

16. A method according to claim 15, further comprising the step of:
    subsequently etching the outside surface of the coating to remove glass material to thereby form an exposed outside surface which substantially consists of the ceramic material.

17. A method according to claim 16, wherein the ceramic material and the glass are mixed in a ratio sufficient to ensure bonding of the ceramic material to the component by the glass.

* * * * *